United States Patent

Compton et al.

[11] Patent Number: 6,056,330
[45] Date of Patent: May 2, 2000

[54] AXIALLY CLAMPING PIPE COUPLER

[76] Inventors: Douglas C. Compton, 109 Broad St., Headland, Ala. 36345; James R. Drury, 3580 McGehee Place Dr. South, Apt. 1708, Montgomery, Ala. 36111

[21] Appl. No.: 08/984,045

[22] Filed: Dec. 3, 1997

Related U.S. Application Data

[63] Continuation-in-part of application No. 08/752,793, Nov. 20, 1993, abandoned.

[51] Int. Cl.[7] .................................................. F16L 23/02
[52] U.S. Cl. ..................... 285/337; 285/133.21; 285/368
[58] Field of Search .............................. 285/12, 31, 337, 285/363, 368, 133.21

[56] References Cited

U.S. PATENT DOCUMENTS

| 580,607 | 4/1897 | Thomine | 285/368 |
| 1,671,789 | 5/1928 | Smith | 285/337 |
| 2,868,576 | 1/1959 | Boughton | 285/337 |
| 3,402,945 | 9/1968 | Rittenhouse . | |
| 4,397,485 | 8/1983 | Wood . | |
| 4,936,609 | 6/1990 | Metcalfe | 285/337 |
| 5,046,765 | 9/1991 | Usui | 285/133.21 |
| 5,509,699 | 4/1996 | Himmelberger | 285/337 |

FOREIGN PATENT DOCUMENTS

| 568801 | 1/1959 | Canada | 285/337 |
| 814289 | 6/1969 | Canada | 285/337 |
| 1580069 | 8/1969 | France | 285/337 |
| 18808 | of 1893 | United Kingdom . | |
| 411087 | 6/1934 | United Kingdom . | |

*Primary Examiner*—Eric K. Nicholson
*Attorney, Agent, or Firm*—Terrance L. Siemens

[57] ABSTRACT

A threadless coupler for connecting two large pipes in line and a third, relatively small pipe to form a Tee. The coupler has a clamp for engaging a male groove formed in each large pipe, the small pipe being connected by threading. The clamp comprises a collar surrounding the retained pipe. The clamp connects to the coupler by threaded fasteners. The coupler has two internal elastic seals which close over their respective large pipes. The clamp may be an annular collar which must be slipped over a pipe prior to forming the male groove, or two complementing sections which may be placed over the pipe after forming the groove. The coupler and pipes are all fabricated from non-malleable materials.

12 Claims, 5 Drawing Sheets

AXIALLY CLAMPING PIPE COUPLER

REFERENCE TO RELATED APPLICATION

This is a Continuation-In-Part of Ser. No. 08/752,793, filed Nov. 20, 1996, now abandoned.

BACKGROUND OF THE INVENTION

1. Field of the Invention

The present invention relates generally to pipe couplings, where pipes are to be connected in abutting sections. More specifically, it relates to an improved coupler that obviates any need of threads on the pipe itself and of corresponding threads in the coupler.

2. Description of Related Art

In the past, the piping field of endeavor generally and in particular, the fire protection industry, has used three conventional piping methods: (1) threaded, (2) welded, and (3) flanged and bolted. Advent of a groove pipe method changed the fire protection industry by virtually eliminating the above mentioned three conventional piping methods for piping in nominal sizes of two and one half inches and larger.

Currently, the fire suppression industry mostly continues to use the threaded pipe method for screw fittings of nominal sizes of two inches and smaller. Over the years various non-threaded pipe connectors were introduced into the industry. The fittings were installed on plain ends of pipe two inches and smaller. These concepts were implemented in an attempt to reduce the cost of time and labor for the dominant threaded systems. All prior art plain end fitting retaining devices which attach to the pipe are concealed inside the coupling housing. All of these plain end pipe connections require internal pipe stops cast inside the fitting housing.

All of these methods force the outside surface of the pipe inwardly when cutting or crimping. Our conclusion is that the continued use of the threaded pipe method is due to the fact that the non-threaded pipe connecting systems have been found to be less secure and therefore not as reliable as the threaded method. That is, pipes were retained by setscrews, which have a propensity to become loose over time. When they are sufficiently loose, internal pressure forces the pipe out of sealed engagement with the coupler. This is known in the fire suppression industry as "blowout". In wet systems such as pressurized fire suppression systems, a considerable amount of water could be discharged onto occupied or otherwise utilized premises. This resulted both water related damage and loss of effective pressure in the fire suppression system.

Devices for connecting pipe are old and well known in the art. U.S. Pat. No. 4,397,485, issued to Sherman L. Wood on Aug. 9, 1983, describes a pipe connector which secures two axially aligned pipes with setscrews bearing perpendicularly against each pipe. No threading is required to connect the two pipes. However, Wood's device is susceptible to blowout. By contrast, the coupler of the present invention engages the two aligned pipes by interference fit established by clamps and secured by threaded fasteners. The clamps act in a direction urging each of the two principal pipes against the coupler. The present invention utilizes pipes having male grooves for enabling interference with the clamps. In accordance with conventional terminology, the term male groove used herein will be taken to mean, on a pipe having an inner radius and an outer radius, a groove having an external radius greater than the outer radius of the pipe. Satisfactory seating of the clamp is readily verified by observation in the present invention. By contrast, effective tightening of setscrews disposed perpendicularly to the pipe cannot be readily observed in the environment of ceiling mounted piping systems.

U.S. Pat. No. 3,402,945, issued to Howard E. Rittenhouse on Sep. 24, 1968, describes a clamped fitting which cooperates with a male grooved pipe. However, the two fittings shown in Rittenhouse are not configured to enable coaxial connection of pipes, threaded fitting of a third pipe, and use of a resilient seal, all being features of the present invention.

U.K. Patent Number 18,808, dated Nov. 11, 1893, describes clamped, coaxial engagement of abutting pipes. However, one pipe has an flared opening for receiving the end of the other, unlike the present invention. Also, the pipes of the U.K. patent do not employ male grooving. An elastic seal is provided in the U.K. patent, but this seal s axially compressed upon tightening the clamp. By contrast, the present invention provides an elastic seal which is radially expanded by insertion of a pipe into the novel coupler, and which seal is not subjected to compressive forces when the clamp is tightened.

U.K. Patent Application Number 411,087, dated Jun. 28, 1934, describes a fitting which secures two male grooved pipes by clamps. However, the U.K. device does not include an elastic seal disposed within the passage of the body of the device, whereas the present invention employs such a seal. Sealing in the U.K. patent is accomplished by deforming the pipe under compression against the body. This requires that the pipe be significantly softer than the fitting, the fitting being utilized with copper or other soft or malleable pipes. The present invention succeeds regardless of malleability or softness of the pipes.

SUMMARY OF THE INVENTION

The present invention provides a coupler which is particularly suitable for assembling branched piping systems in tight and cramped quarters where access and working space are limited. The coupler can be used for piping systems carrying air, water, or hydraulic fluids. A preferred application of the coupler is in assembling fire sprinkling systems for protecting occupied buildings. In this preferred application, a preferred standard of piping is between schedule 5 and schedule 100.

The fire protection industry presently cold rolls pipe to form female grooves. The instant invention employs the cold rolled groove method but instead of rolling the groove inwardly, the groove is rolled outwardly. This external or male groove is formed at a distance from the end of the pipe greater than that formerly employed. The same grooving machinery can be used by changing the pipe rollers. Therefore the need of new and expensive machinery is eliminated.

The piping system may then be assembled by forming the male groove and inserting the pipe into the novel coupler. A clamp and threaded fasteners are then installed to secure the pipe to the coupler. The clamp engages the male groove by interference in a direction parallel to that of the pipe. The threaded fasteners are readily accessible at the exterior of the coupler, and their installation is readily discerned by eye. Unlike tightening setscrews arranged perpendicularly to the pipe, such as those utilized by the device of Woods, tightening the threaded fasteners in the present invention against the clamp provides a solid feel verifying satisfactory tightening. Therefore, the connection enjoys reliability of threaded connection even though the pipe itself is not threaded. Only one type of tool is required to tighten the fasteners. Blowout is essentially impossible as long as male and female members of the threaded fasteners are mated, even if they are not tight. Prior to full tightening of the threaded fasteners, the pipe may be rotated. Full tightening produces a rigid, non-rotatable connection to the coupler.

Engagement of the groove by the clamp enables the groove to serve as a stop preventing the pipe from penetrating into the coupler excessively. Alternatively, a stop may be provided if it is desired to arrest penetration of the pipe prior to contact of the male groove with the coupler.

A grooving tool or machine is used for creating a male groove near the end of the pipe. This tool is conventional, and can be readily adapted to form a male groove rather than female grooves. Thus, no different or expensive equipment is required to form male grooves. The male grooved pipe is then fitted into one end of the novel coupler. The coupler contains an elastic seal which contacts and makes a watertight connection with the outer surface of the pipe. Therefore, the coupler body may be formed from a non-malleable material and still be sealingly compatible with non-malleable pipes, such as those made from steel.

Thus far, connection of one pipe has been described. In preferred embodiments, the coupler has coaxially aligned openings enabling two opposing sections of similar pipe to be joined coaxially, thus effectively extending the pipe. However, the novel coupler is preferably formed as a T-fitting also enabling threaded connection of a third pipe.

Accordingly, it is a principal object of the invention to provide a connector for connecting unthreaded pipes.

It is another object of the invention to provide the same reliability as threaded connections, but without the expense of cutting threads.

It is a further object of the invention to improve ease of assembling piping systems under conditions of cramped, overhead quarters.

Still another object of the invention is to reliably prevent blowout of a pipe and its connector.

An additional object of the invention is to urge the pipe into engagement with the coupler in a direction parallel to the pipe, thus effecting a pressure seal while securing engagement.

It is again an object of the invention to locate all fasteners in readily accessible locations on the exterior of the coupler.

Yet another object of the invention is that the coupler be compatible with non-malleable pipe.

A further object of the invention is to provide rigid, non-rotatable connection of the pipe after the connection is tightened, and which may be rotated after loosening the connection.

Still another object of the invention is to employ existing roll grooving tools and machinery.

It is another object of the invention to provide a connection which can be visually inspected for proper installation.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

DESCRIPTION OF THE PREFERRED EMBODIMENTS

Figure 1:
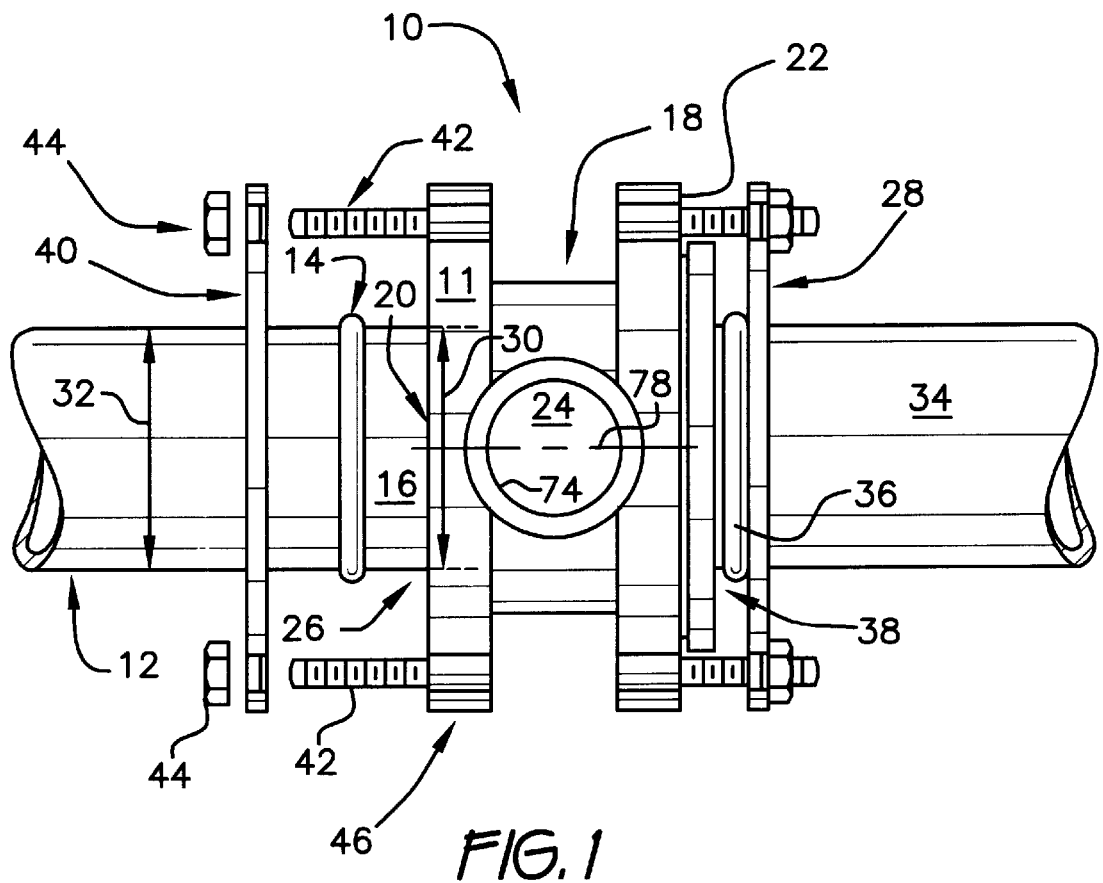
FIG. 1 is a partially exploded, side elevational view of one embodiment of the invention.
Figure 10:
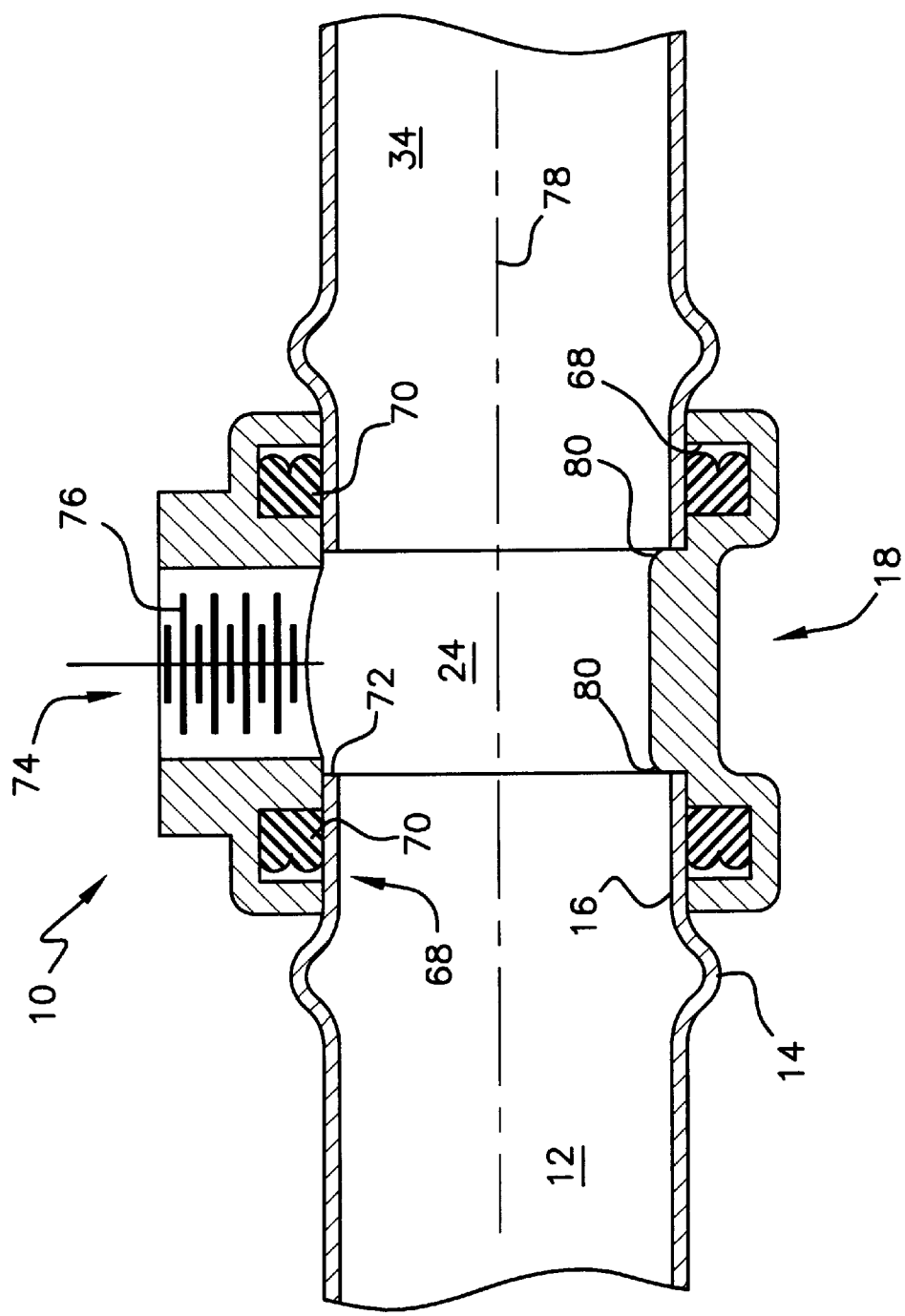
FIG. 10 is a top plan view similar to FIG. 1, partially broken away to reveal internal detail.

A preferred embodiment of coupler 10 is shown in FIG. 1, coupler 10 being employed to connect to and retain a first pipe 12 having a male groove 14 formed therein. A ridge results when constituent material of the pipe is displaced radially outwardly. Where the outer surface of the pipe bulges outwardly, as indicated at 14 and 36 in FIG. 1, there is a corresponding concavity formed inside the pipe, as shown in FIG. 10. The process by which the ridge is formed is similar to forming an inwardly projecting groove, such as by cold rolling, except that the ridge is rolled outwardly. Pipe 12 is fabricated from steel or other non-malleable material. Groove 14 is located proximate to yet sufficiently distant from the end of pipe 12 such that an end section 16 is created between groove 14 and the end of the pipe. Coupler 10 comprises a cast iron, cast steel, or other non-malleable body 18 having first and second faces 20, 22. An internal passage 24 (more fully shown in FIG. 10) has a first opening 26 located at and opening to face 20 and a second opening 28 located at and opening to face 22. Passage 24 has an internal diameter 30 greater than the exterior diameter 32 of pipe 12, so that end section 16 can be inserted into opening 26. Internal passage 24 has a straight center line 78. Faces 22, 24 are parallel and opposed to one another. Coupler 10 thus can connect two pipes 12, 34 in coaxial relation.

Passage 24 communicates between face 20 and face 22. Face 22 preferably is configured similarly to face 22, so that pipe 34, which has a male groove 36 and an end section 38, can be inserted into passage 24 in a manner similar to that of pipe 12.

Clamp 40 is placed over pipe 12 and will subsequently be secured in this position by tightening a member of an assembly of threaded fasteners. For the purposes of this discussion, an assembly of threaded fasteners will signify any number of pairs of threaded fasteners employed to secure one clamp, each pair of threaded fasteners including one male component and a mating female component. In the embodiment of FIG. 1, there are two assemblies of threaded fasteners at each face 20 or 22 of body, each assembly comprising one stud 42 and one nut 44. Each stud 42 is embedded within body 18 at a boss 46, or otherwise suitably fixed to body 18.

It will be appreciated that the arrangement of threaded fasteners may be present in many variations. For example, relative positions of the male and female components may be reversed by providing a threaded bore (not shown) in each boss 46 and providing a bolt (not shown) to be threaded into the bore. Regardless of the precise selected arrangement of threaded fasteners, there are certain characteristics of the assembly of threaded fasteners that always prevail. One is that there will always be one component disposed proximate body 18 and the other component being threadably separable from the proximate component. In the embodiment of FIG. 1, stud 42 is the proximate component and nut 44 is the separable component.

Another characteristic of the assembly of threaded fasteners is the separable member, be it male or female, is arranged such that it approaches body 18 when being threaded onto the proximate component. Illustratively, nut 18 approaches body 18 when threaded onto stud 42. If a threaded bore were formed in boss 46, then a bolt or the like would approach body 18 as it is threaded into the bore. The action of tightening nut 44 therefore draws pipe 12 towards body 18. Tightening therefore exerts forces on pipe 12 which do not act to disturb appropriate alignment and contact of pipe 12 with body 12. Also, tightening does not radially distort annular pipes.

It will be seen that faces 20, 22 are located on opposed sides of body 18, and are preferably parallel. Openings 26, 28 of passage 24 preferably open in opposed directions, so that coupler 10 enables linear extension of a pipe 12 or 34 by another section of pipe 34 or 12. Preferably, but not necessarily, openings 26, 28 are aligned so that after assembly, pipes 12, 34 are coaxially oriented. Body 18 is generally bilaterally symmetrical, or formed in mirror image fashion, so that the assembly or assemblies of threaded fasteners provided at face 20 is repeated at face 22. Thus, elements are provided for retaining both pipes 12, 34 to the body 18.

It is not absolutely necessary that both elements be identical. In some applications, one element could comprise conventional female threading (not shown) for enabling threaded connection of a first pipe, and clamped connection of a subsequent pipe. However, bilateral symmetry assures that simple connection of a pipe under even difficult circumstances will be possible.

Figure 2:
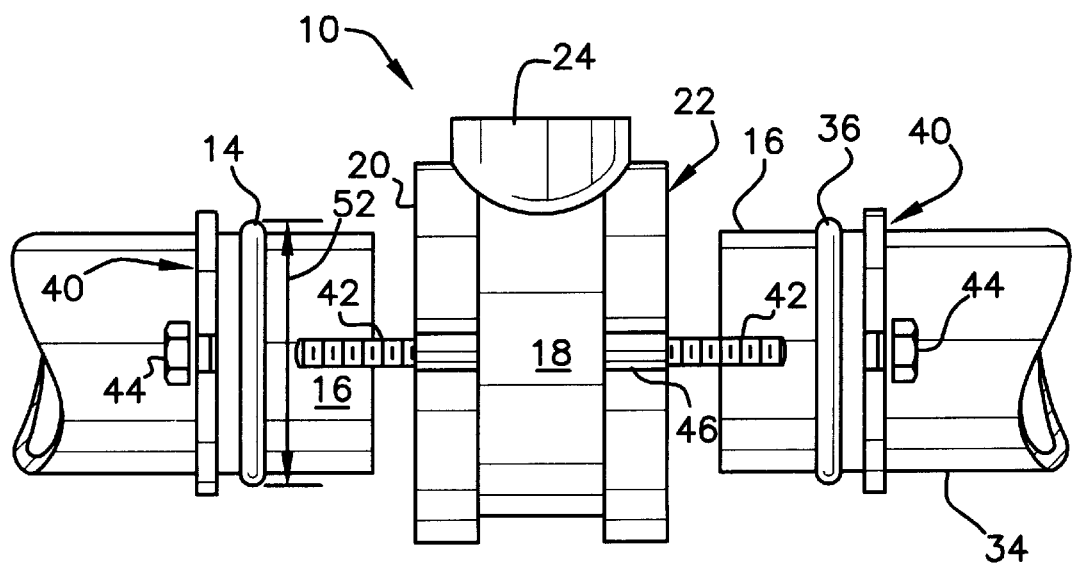
FIG. 2 is a top plan view of FIG. 1, with additional components shown exploded.
Figure 7:
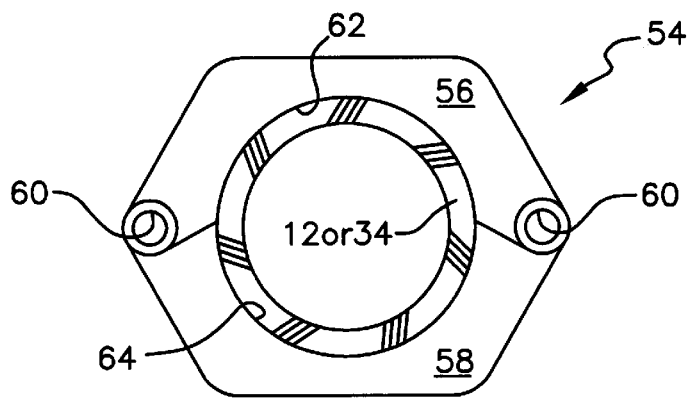
FIG. 7 is a front view of a clamp seen at the right and left of FIG. 1.
Figure 8:
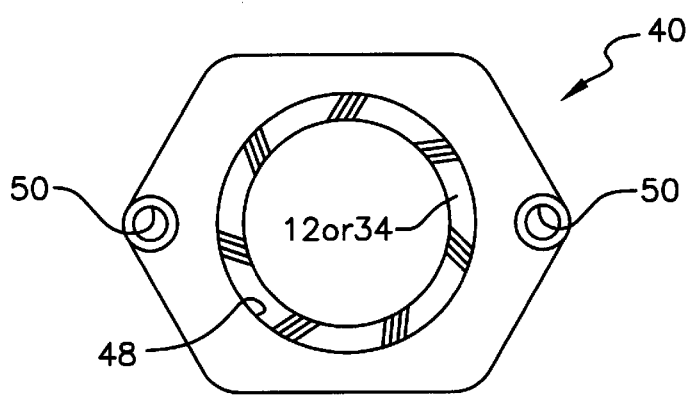
FIG. 8 is a front view of a second embodiment of the clamp of FIG. 7.
Figure 9:
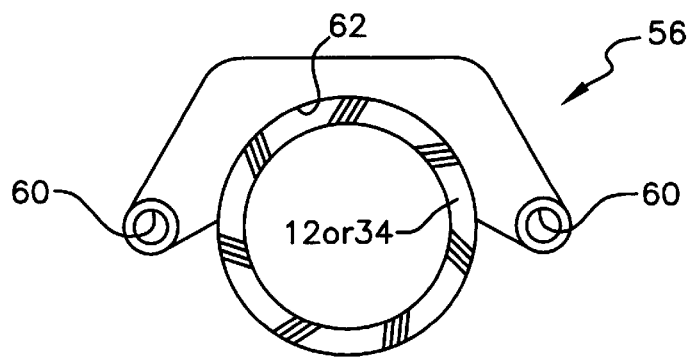
FIG. 9 is a detail view showing one of the two components of the clamp of FIG. 7.

Referring now to FIGS. 7–9, two embodiments of the clamp will be described. Clamp 40 comprises a flat plate having a central opening 48 dimensioned and configured to surround pipe 12 or 34 easily. There is no requirement for very close fit of pipe 12 or 34 with opening 48. Two fastener openings 50 are located in the plate so that stud 42 or its equivalent may simultaneously penetrate through clamp 40. The diameter of opening 48 is greater than outer diameter 52 (see FIG. 2) of male groove 14, thereby assuring interference with male groove 14 when coupler 10 is assembled.

Clamp 40 must be installed on pipe 12 or 14 prior to forming groove 14. Preferably, a clamp 54 enabling installation after formation of groove 14 is provided. This affords ready disassembly and subsequent reassembly of pipes 12, 34 to body 18 without requiring fabrication of new pipes 12, 34. Clamp 54 comprises two complementing sections 56, 58 each having two fastener openings 60. Sections 56, 58 may be identical, with assembly requiring inverting one section 56 or 58 relative to the other 58 or 56. Each section 56 or 58 has a respective relief 62 or 64 dimensioned and configured to simulate opening 48 of clamp 40 when sections 56, 58 are joined in the manner shown in FIG. 7. Of course, openings 60 formed in each section 56 or 58 are dimensioned and configured to be alignable with and accept penetration of studs 42 during assembly.

Figure 3:
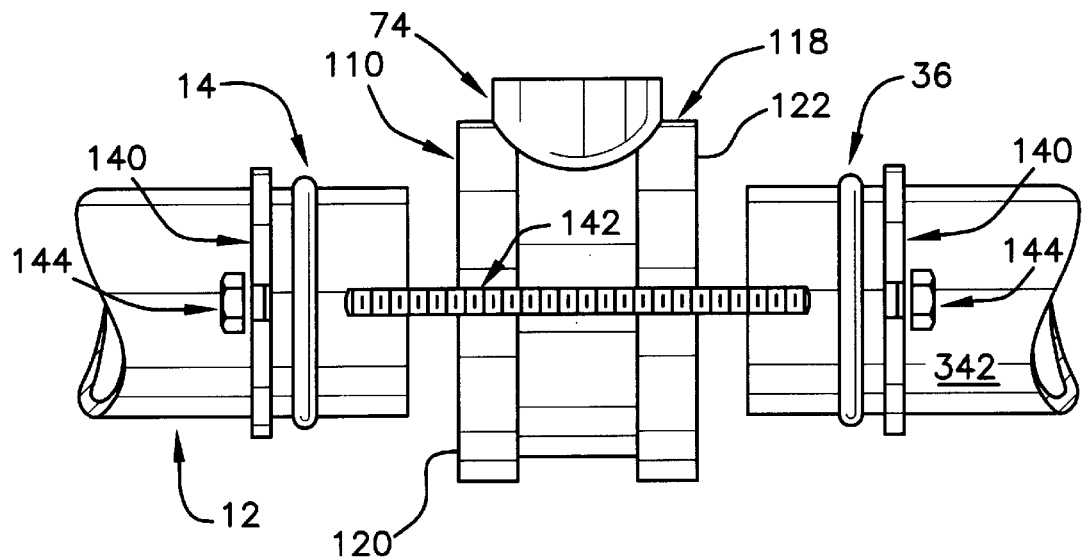
FIG. 3 is an exploded top plan view of a second embodiment of the invention.
Figure 4:
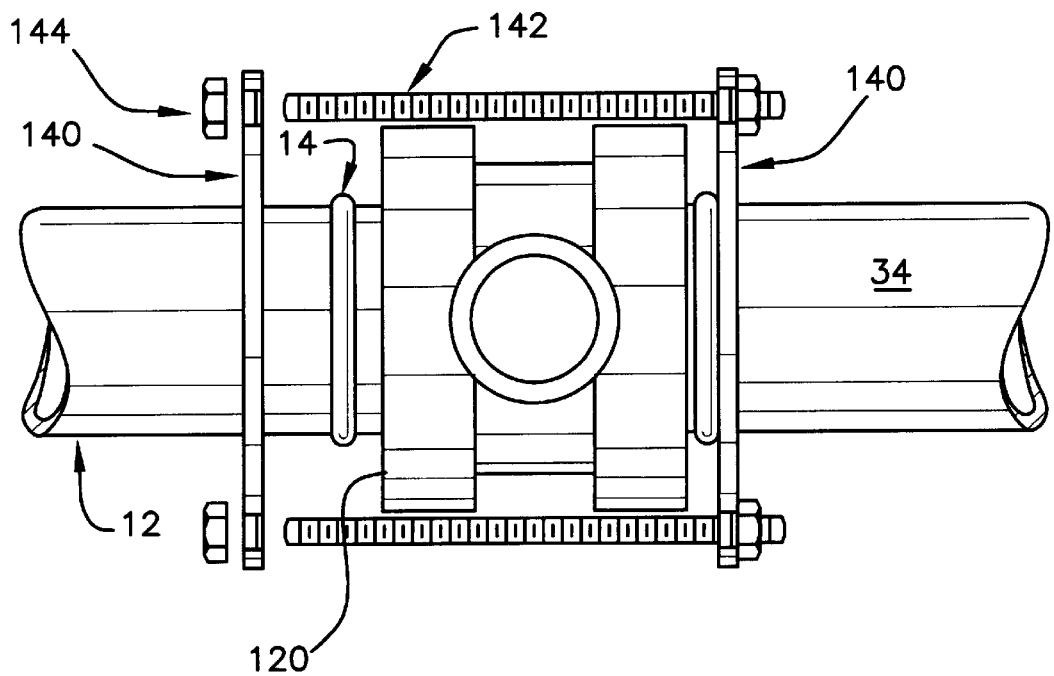
FIG. 4 is a side elevational view of FIG. 3.

FIGS. 3 and 4 illustrate an embodiment of the invention wherein clamps 140 are fastened by common male components of the assembly of threaded fasteners. In this embodiment, body 118 has construction generally similar to that of body 18 of FIG. 1, but lacks bosses 46 and studs 42. Instead, an elongated threaded shaft 142 spans body 118 of coupler 110, extending beyond faces 120, 122. Shaft 142 is long enough to enable nuts 144 to be tightened thereonto after clamps 140 have been installed over male grooves 14,36 of pipes 12, 34. Apart from shaft 142 being separate from body 118, assembly and connection of pipes 12, 34 to coupler 110 are accomplished in a manner similar to that of the embodiment of FIG. 1. As in the case of the embodiment of FIG. 1, clamp 140 may be replaced by a clamp (not shown) formed in complementing sections.

Figure 5:
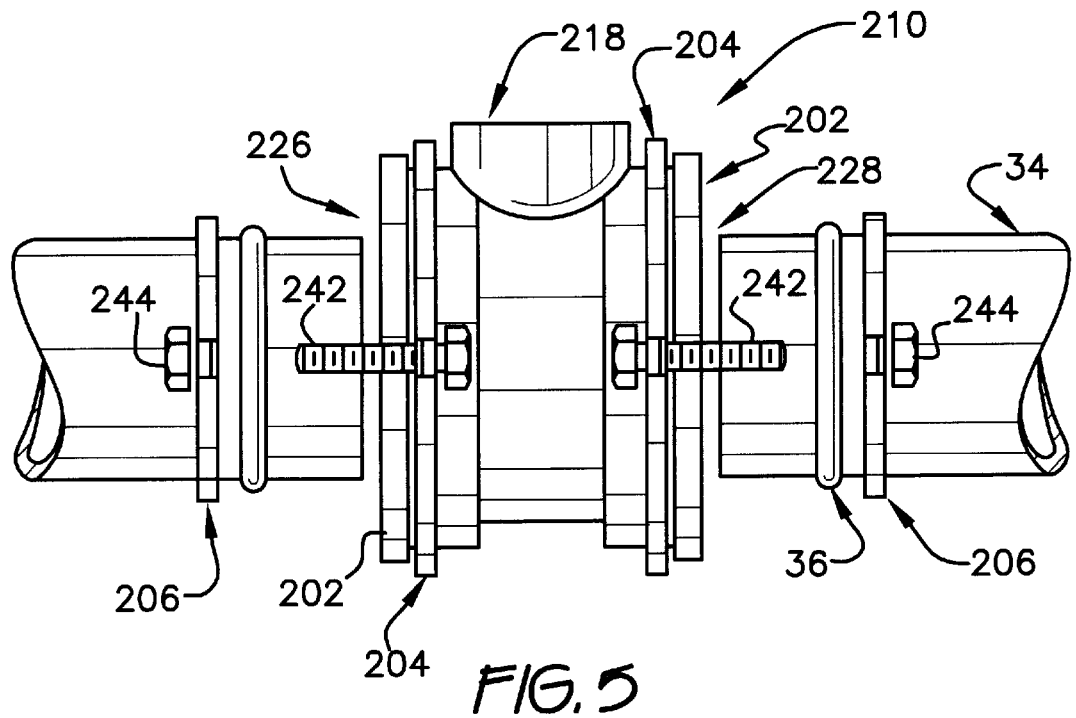
FIG. 5 is an exploded top plan view of a third embodiment of the invention.
Figure 6:
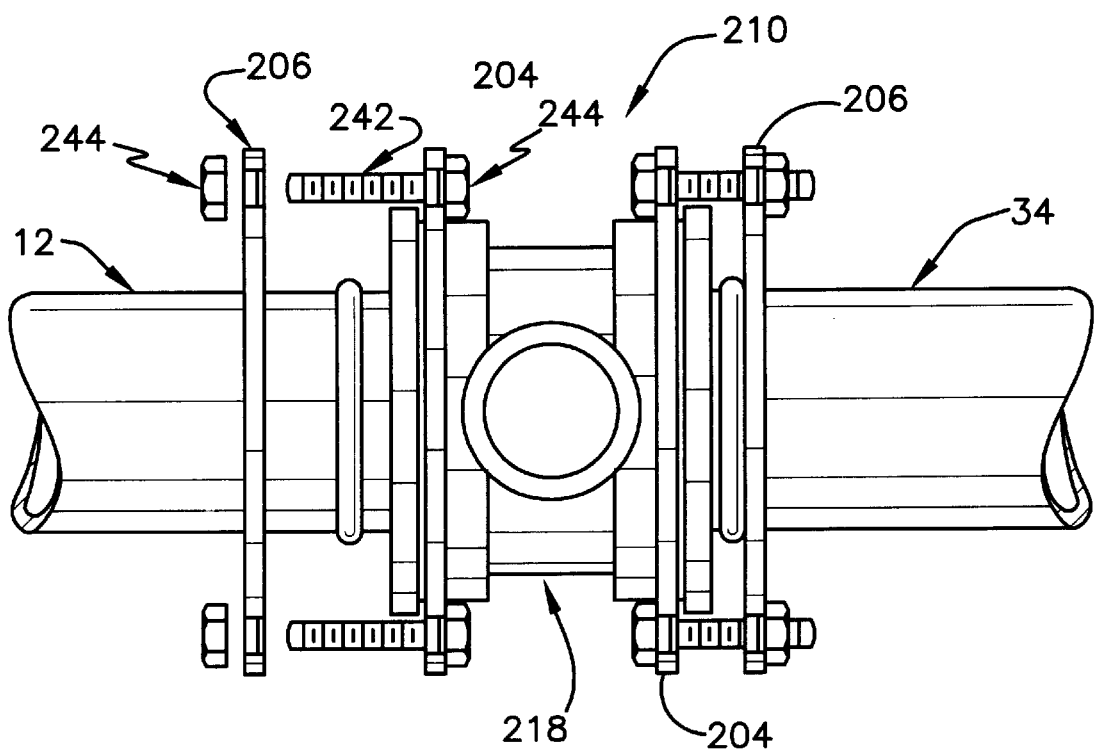
FIG. 6 is an exploded side elevational view of FIG. 5.

FIGS. 5 and 6 illustrate a third embodiment of the invention. Coupler 210 has a body 218 generally similar to that of the embodiment of FIG. 3, except that an outwardly projecting flange 202 is provided at each end of body 218. A retainer comprising inner member 204 and outer member 206 which entrap one flange 202 between themselves. Outer member 206 is dimensioned and configured to pass pipes 12 and 34 and to interfere with male groove 14 in a manner similar to that of clamp 40 of FIG. 1. Inner member 204 and outer member 206 may each repeat the characteristics of clamp 54 of FIG. 7, with appropriate modification of dimensions. Inner member 204 surrounds body 218 and opening 226, and is located between flanges 202. This location assures abutment of one flange 202 when assembly is complete.

The assembly of threaded fasteners for connecting each pipe 12 or 34 comprises two bolts 242 or an equivalent threaded shaft and two nuts 244. Therefore, the total number of bolts 242 required to assemble pipes 12 and 34 to coupler 210 is four, with an equal number of nuts 244. Bolts 242 are longer than the combined thicknesses of the retainer, one flange 202, and two nuts 244. Therefore, the retainer, which replaces clamps 40, 54, and 140 of the previous embodiments, may be placed over the male groove 14 of each pipe 12 or 34 when the pipe 12 or 34 is inserted into its respective opening 226 or 228 and clamped. Clamping is accomplished by passing bolts 242 through the fastener openings of the inner and outer members 204, 206 of each retainer, and tightening one nut 244 to bolt 242. Alternatively, if a plain threaded shaft (not shown) is employed in place of a bolt 242, then a suitable nut (not shown) will be threaded to the shaft to serve in place of the head of bolt 242.

It will be seen by examining the right side of FIGS. 1, 4, and 6 that after tightly clamped, male groove 14 does not contact face 22, 122, or 222 of body 18, 118, or 218. Sealing is not dependent upon continuous contact of male groove 14 with body 18, 118, or 218. Rather, sealing is accomplished inside passage 24. Turning now to FIG. 10, passage 24 is seen to have a groove 68 formed therein. Groove 68 seats an annular elastic or resilient seal, such as sealing ring 70, in a manner coaxial to and within passage 24. Sealing ring 70 is dimensioned and configured to project into passage 24 so that when a pipe 12 or 34 is inserted into passage 24, sealing ring 70 is compressed outwardly. This relation assures sealing of pipe 12 or 34 to body 18 of coupler 10. It will be noted that the distance sealing ring 70 and opening 26 at face 20 is shorter than the distance between end 72 of pipe 12 and male groove 14 of pipe 12. Sealing ring 70 makes a watertight connection with the outer surface of the pipe. Alternatively, if not a sealing ring, a corresponding seal of the type shown in U.S. Pat. No. 4,397,485, to Wood, hereby incorporated by reference, may be substituted FIG. 10 shows two further features of coupler 10. One is that body 18 forms a third opening 74 communicating with openings 26, 28. Opening 74 bears threads 76 for accepting a threaded third pipe (not shown), whereby three pipes may be connected to and communicate among one another at coupler 10. Preferably, opening 74 is oriented perpendicularly to center line 78 of passage 24, coupler 10 thereby being a Tee-fitting.

Another feature shown in FIG. 10 is that of an optional stop 80. Stop 80, which projects into passage 24, is provided to assure that a pipe 12 or 34 inserted into body 18 will not penetrate excessively, thereby interfering with flow through passage 76 or otherwise interfering with assembly or proper operation.

The invention may be seen as comprising only coupler 10, 110, or 210, together with associated clamps 40, 54, 140 or retainer and the various threaded fasteners. Alternatively, the invention may further comprise the combination of coupler 10, 110, or 210 with a pipe 12 or 34 having a male groove 14, the pipe 12 or 34 having an exterior diameter smaller than that of opening 26 or 28, 126 or 128, or 226 or 228, male groove 14 having an exterior diameter greater than that of opening 26 or 28, 126 or 128, or 226 or 228.

When connecting pipes with the present invention, each unthreaded section of pipe is loosely fitted into its opening 26 or 28, 126 or 128, or 226 or 228. Clamping the pipe both secures the pipe in place and also presses the pipe into effective engagement with the seal. No conscious effort need be devoted to establishing sealing engagement of the pipe and the novel connector.

The present invention may be varied or modified without departing from the inventive concept. For example, the axis of stud 42 of FIG. 1 or a bolt (not shown) which may be furnished in place of stud 42, if locations of female and male components of that assembly of threaded fasteners were reversed, could be oriented at an acute angle to center line 78 of passage 24. There merely need be a component of motion parallel to center line 78 for the subject fastener to draw a pipe 12 or 34 towards body 18.

It is to be understood that the provided illustrative examples are by no means exhaustive of the many possible constructions of and uses for the invention.

It is to be understood that the present invention is not limited to the embodiments described above, but encompasses any and all embodiments within the scope of the following claims.

We claim:

1. A coupling system for connecting a first pipe to a second pipe, comprising:
    a coupler having
        a body having a first face, a second face, and an internal passage having a first opening located at and opening to said first face and a second opening located at and opening to said second face, said internal passage communicating between said first face and said second face, said internal passage having an internal diameter,
        an internal groove formed entirely within said body, said internal groove opening only to said internal passage of said body,
        an elastic annular seal disposed coaxially to and within said internal groove,
        a first clamp comprising a first assembly of threaded fasteners disposed to releasably and adjustable clamp one pipe axially to said body by drawing said pipe into axial engagement with said coupler, comprising a male component and a corresponding female component, one of said male component and said female component being a proximal member disposed proximate said body, and the other one of said male component and said female component being a separable member threadably separable from said proximal fastening member, said first assembly of threaded fasteners being located at said first face of said body, said first assembly of threaded fasteners arranged such that said separable member approaches said body when being threaded onto said fixed member and avoids entering said internal passage, and
        an opening for receiving a second pipe, wherein said opening communicates with said internal passage of said body; and
    a pipe having a first end and a ridge formed by displacing constituent metal of the pipe radially outwardly such that where an outward bulge exists in the exterior surface of the pipe, a corresponding concavity is formed in the interior surface of the pipe, wherein said ridge is proximate said first end, and is dimensioned and configured to be received and secured by said clamp of said coupler.

2. The coupling system according to claim 1, said internal passage having a straight center line, and said first face being parallel and opposed to said second face, whereby said coupler connects two pipes in coaxial relation.

3. The coupling system according to claim 1, further comprising a second clamp disposed to releasably clamp the other pipe to said body, said second clamp comprising a male component and a corresponding female component, one of said male component and said female component being a proximal member disposed proximate said body, and the other one of said male component and said female component being a separable member threadably separable from said proximal fastening member, said second threaded fastening means being located at said second face of said body, said second threaded fastening means arranged such that said separable member approaches said body when being threaded onto said fixed member and avoids entering said internal passage.

4. The coupling system according to claim 1, said body having a stop projecting into said internal passage.

5. The coupling system according to claim 1, wherein said first clamp comprises at least one fastener opening adapted to admit passage of said male component of said first assembly of threaded fasteners, said clamp being dimensioned and configured to surround a pipe having a ridge having a corresponding concavity formed at the interior surface of the pipe and to engage the ridge by interference when the pipe is inserted into said first opening of said body and said clamp is placed over said ridge.

6. The coupling system according to claim 5, further comprising two assemblies of threaded fasteners, said clamp comprising two complementing sections each having two said fastener openings, wherein each said section of said clamp is identical to the other said section, separate from the other said section, and one said section is inverted with respect to the other said section, each said fastener opening of each one of said two complementing sections being dimensioned and configured to be alignable with and accept penetration of said male component of one said assembly of threaded fasteners.

7. The coupling system according to claim 1, said male component of said first assembly of threaded fasteners comprising a threaded shaft spanning and extending beyond said first face and said second face, and said female component of said first assembly of threaded fasteners comprising a nut.

8. The coupling system according to claim 1, said male component of said first assembly of threaded fasteners comprising two threaded shafts each embedded within said body and projecting from said first face of said body, and said female component of said first assembly of threaded fastener comprising nuts.

9. The coupling system according to claim 1, said body including an outwardly projecting flange surrounding said first opening and a retainer dimensioned and configured to surround said body and abut said flange, said male component of said first assembly of threaded fasteners comprising two threaded shafts and said female component of said first assembly of threaded fastener comprising four nuts, said retainer comprising an inner member and an outer member, each one of said inner member and said outer member comprising two complementing sections each having two fastener openings, each said fastener opening of each one of said two complementing sections being dimensioned and configured to be alignable with and accept penetration of one said threaded shaft, said threaded shaft being longer than the combined thicknesses of said retainer, said flange, and two said nuts, whereby said retainer may be placed over said ridge of the pipe when the pipe is inserted into the first opening and clamped by passing said threaded shafts through said fastener openings of said retainer and tightening one said nut to each end of each one of said two threaded shafts.

10. The coupling system according to claim 1, the distance between said annular seal and said first opening being shorter than the distance between said first end of said pipe and said ridge of said first pipe.

11. The coupling system according to claim 1, said internal passage having a third opening communicating with said first opening and said second opening, said third opening bearing threads for mating with a threaded pipe, whereby three pipes may be connected to and communicate among one another at said coupler.

12. A coupling system for connecting two pipes each having a first end and a ridge proximate said first end to a third pipe, comprising:

a coupler having
a body having a first face, a second face opposed to and parallel to said first face, and an internal passage having a first opening located at and opening to said first face and a second opening located at and opening to said second face, said internal passage communicating between said first face and said second face, said internal passage having an internal diameter and a straight center line, said internal passage having a third opening communicating with said first opening and said second opening, said third opening bearing threads for mating with a threaded pipe, whereby the three pipes may be connected to and communicate among one another at said coupler,
an internal groove formed entirely within said body, said internal groove opening only to said internal passage of said body,
an elastic annular seal disposed coaxially to and within said internal groove,
a first clamp disposed to releasably clamp a first pipe having a ridge to said first opening by drawing the first pipe into axial engagement with said coupler and a second clamp disposed to releasably clamp a second pipe having a ridge to said second opening, wherein
said first clamp comprises a first assembly of threaded fasteners disposed to releasably and adjustably clamp one pipe to said body by said first clamp, comprising a male component and a corresponding female component, one of said male component and said female component being a proximal member disposed proximate said body, and the other one of said male component and said female component being a separable member threadably separable from said proximal fastening member, said first assembly of threaded fasteners being located at said first face of said body, said first assembly of threaded fasteners arranged such that said separable member approaches said body when being threaded onto said fixed member and avoids entering said internal passage, and
said second clamp comprises a second assembly of threaded fasteners for clamping a second pipe to said body by said second clamp, said second assembly of threaded fasteners comprising a male component and a corresponding female component, one of said male component and said female component being a proximal member disposed proximate said body, and the other one of said male component and said female component being a separable member threadably separable from said proximal fastening member, said second assembly of threaded fasteners being located at said second face of said body, said second assembly of threaded fasteners arranged such that said separable member approaches said body when being threaded onto said fixed member and avoids entering said internal passage;
a first pipe having a first end and a ridge formed proximate said first end, wherein said ridge is formed by displacing constituent metal of the pipe radially outwardly such that where an outward bulge exists in the exterior surface of said first pipe, a corresponding concavity is formed in the interior surface of said first pipe; and
a second pipe having a first end and a ridge formed proximate said first end, wherein said ridge is formed by displacing constituent metal of the pipe radially outwardly such that where an outward bulge exists in the exterior surface of said second pipe, a corresponding concavity is formed in the interior surface of said second pipe,
wherein said first pipe and said third pipe are dimensioned and configured to be received and secured by said clamp of said coupler.

\* \* \* \* \*